(12) United States Patent
Dahlén (10) Patent No.: US 9,130,873 B2
(45) Date of Patent: Sep. 8, 2015

(54) REAL TIME COMPOSITION OF SERVICES

(75) Inventor: Torbjörn Dahlén, Kölängsv (SE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 2252 days.

(21) Appl. No.: 11/827,498

(22) Filed: Jul. 12, 2007

(65) Prior Publication Data

US 2009/0016377 A1    Jan. 15, 2009

(51) Int. Cl.
*H04L 12/28* (2006.01)
*H04L 12/24* (2006.01)

(52) U.S. Cl.
CPC .................................. *H04L 41/5058* (2013.01)

(58) Field of Classification Search
CPC ............ H04L 41/5058; H04L 41/5045; H04L 41/5048; H04L 41/5051; H04L 41/5054
USPC ................................ 370/492, 395.21, 395.43
See application file for complete search history.

(56) References Cited

U.S. PATENT DOCUMENTS

| | | | |
|---|---|---|---|
| 6,885,871 B2 * | 4/2005 | Caloud | 455/466 |
| 6,983,312 B1 * | 1/2006 | O'Neil | 709/217 |
| 7,058,068 B2 * | 6/2006 | Gawargy et al. | 370/410 |
| 7,418,485 B2 | 8/2008 | Payrits | |
| 7,453,997 B2 | 11/2008 | Miller et al. | |
| 7,568,224 B1 * | 7/2009 | Jennings et al. | 726/14 |
| 2003/0187992 A1 | 10/2003 | Steenfeldt et al. | |
| 2004/0186883 A1 | 9/2004 | Nyman et al. | |
| 2004/0215824 A1 | 10/2004 | Payrits | |
| 2005/0071423 A1 | 3/2005 | Rajaniemi | |
| 2005/0198304 A1 * | 9/2005 | Oliver et al. | 709/227 |
| 2005/0198320 A1 | 9/2005 | Chou et al. | |
| 2005/0228984 A1 * | 10/2005 | Edery et al. | 713/153 |
| 2006/0106945 A1 * | 5/2006 | Westervelt et al. | 709/246 |
| 2006/0168319 A1 * | 7/2006 | Trossen | 709/238 |
| 2006/0245403 A1 * | 11/2006 | Kumar | 370/338 |
| 2007/0223462 A1 * | 9/2007 | Hite et al. | 370/356 |
| 2008/0120705 A1 * | 5/2008 | Beyer et al. | 726/5 |

FOREIGN PATENT DOCUMENTS

WO    2009/008807 A1    1/2009

OTHER PUBLICATIONS

Deason, N., "SIP and SOAP", Internet Engineering Task Force, Internet Draft, Jun. 30, 2000, http://www.softarmor.com/wgdb/docs/draft-deason-sip-soap-00.txt.
Box, D., et al. "Simple Object Access Protocol (SOAP) 1.1", W3C, May 8, 2000, http://www.w3.org/TR/2000/NOTE-SOAP-20000508/.
Mitra, N., et al., "SOAP Version 1.2 Part 0: Primer (Second Edition), W3C Recommendation Apr. 27, 2007," W3C, http://www.w3.org/TR/soap12-part0/, pp. 1-47.

(Continued)

*Primary Examiner* — Mark Rinehart
*Assistant Examiner* — Mang Yeung
(74) *Attorney, Agent, or Firm* — Patent Portfolio Builders PLLC (57) ABSTRACT

Real-time service composition is provided by a Session Initiation Protocol (SIP) transport binding for Simple Object Access Protocol (SOAP) messages. A SOAPAction header and SOAP envelope can be included in a SIP message to identify a requested service. The SIP message recipient can parse out the SOAP envelope and forward same to a corresponding Web Service.

6 Claims, 4 Drawing Sheets

(56) References Cited

OTHER PUBLICATIONS

Chinnici, R., et al., "Web Services Description Language (WSDL) Version 2.0 Part 1: Core Language, W3C Working Draft 3, Aug. 2004," W3C, http://www.w3.org/TR/2004/WD-wsdl20-20040803/, pp. 1-72.

Rosenberg, J., et al., "SIP: Session Initiation Protocol, RFC 3261," IETF, Jun. 2002, http://tools.ietf.org/html/rfc3261, pp. 1-336.

Clement, L., et al., "UDDI Version 3.0.2, UDDI Spec Technical Committee Draft, Dated Oct. 19, 2004," OASIS, http://uddi.org/pubs/uddi_v3.htm, pp. 1-370.

Gudgin, M., et al., "SOAP Version 1.2, W3C Working Draft Jul. 9, 2001," W3C, http://www.w3.org/TR/2001/WD-soap12-20010709, pp. 1-48.

Rosenberg, J., "Identification of Communications Services in the Session Initiation Protocol (SIP)," IETF, May 7, 2007, http://tools.ietf.org/html/draft-rosenberg-sipping-service-identification-02, pp. 1-18.

Rosenberg, J., et al., "Caller Preferences for the Session Initiation Protocol (SIP), RFC 3841," Aug. 2004, ftp://ftp.rfc-editor.org/in-notes/rfc3841.txt, pp. 1-24.

Berners-Lee, T., et al., "Uniform Resource Identifiers (URI): Generic Syntax, RFC 2396," IETF, Aug. 1998, http://www.ietf.org/rfc/rfc2396.txt, pp. 1-36.

Moats, R., "RFC 2141-URN Syntax," May 1997, http://www.faqs.org/rfcs/rfc2141.html, pp. 1-6.

Box, D., et al., "Simple Object Access Protocol (SOAP) 1.1, W3C Note May 8, 2000," W3C, http://www.w3.org/TR/2000/NOTE-SOAP-20000508/, pp. 1-33.

Deason, N., "SIP and SOAP," Internet Engineering Task Force, Internet Draft, Jun. 30, 2000, http://www.softarmor.com/wgdb/docs/draft-deason-sip-soap-00.txt, pp. 1-9.

Office Action mailed Dec. 21, 2007 from Swedish Patent Office for Swedish Application No. 0701714-8.

Liu, F., et al., "WSIP—Web Service SIP Endpoint for Converged Multimedia/Multimodal Communication over IP," Proceedings of the IEEE International Conference on Web Services (ICWS'04), 2004, pp. 1-8.

Gudgin, M. et al., "SOAP Version 1.2 Part 1: Messaging Framework", Internet Citation, XP002318628.

Gudgin, M. et al., "SOAP Version 1.2 Part 2: Adjuncts", Internet Citation, XP002335585.

Almar, I. et al., "Sending SOAP over SIP", IETF Mailing Archive, May 14, 2002, pp. 1-3, XP002514932.

Dorgham, S.(ed.), "Next-Gen Open Service Solutions over IP (N-GOSSIP)—Area for SIP Enhancements", Internet Citation, XP002235858.

Mitra, N. et al., "SOAP Version 1.2 Part 0: Primer (Second Edition)" W3C Recommendation, Apr. 27, 2007, pp. 1-59, XP002514933.

Walsh, A. E. (ed.), "UDDI, SOAP and WSDL: The Web Services Specification Reference Book", pp. 18-25, 179, XP002495018.

Nanjundaswamy, V.K.: "Novell Nsure UDDI Server Architecture", Mar. 29, 2004, retrieved from: ftp://ftp.novell.hu/pub/mirrors/ftp.novell.com/forge/uddi/docs/Nsure%20UDDI%20OS%20Arch.pdf.

Sheng, Q. Z. et al.: "Discovering E-Services Using UDDI in SELF-SERV", In Proc. of the International Conference on E-Business (ICEB 2002); retrieved from http://soc.web.cse.unsw.edu.au/papers/iceb2002.pdf.

US Office Action issued on Jul. 13, 2009 in corresponding U.S. Appl. No. 11/975,942.

* cited by examiner

REAL TIME COMPOSITION OF SERVICES

TECHNICAL FIELD

The present invention relates generally to communications and in particular to methods, devices and systems for providing real-time composition of services in communications systems.

BACKGROUND

Communication systems continue to grow and evolve. Convergence between different types of communication systems, e.g., Internet Protocol (IP), connection-based voice communications, and the like, is advancing rapidly. Recently the phrase "Next Generation Network" (NGN) has been used to describe various activities associated with this evolution. As defined by the International Telecommunications Union (ITU), an NGN is a packet-based network able to provide services (including telecommunication services) and able to make use of multiple broadband, QoS-enabled transport technologies and in which service-related functions are independent from underlying transport-related technologies. NGNs will also likely offer unrestricted access by users to different service providers and will support generalized mobility, which in turn will provide for consistent service provision to end users.

So-called "Web Services" are another feature which may become commonplace in NGNs. Web Services provide, for example, a mechanism for interoperability between software entities which reside on different infrastructures and which may be operated by different companies. Web Services are typically defined as providing distributed services using, e.g., the standards suite Web Services Description Language (WSDL), Simple Object Access Protocol (SOAP) and Universal Description, Discovery and Integration (UDDI). For the interested reader, a description of WDSL can be found online as "Web Services Description Language (WSDL) Version 2.0 Part 1: Core Language, W3C Working Draft 3, August 2004" at http://www.w3.org/TR/2004/WD-wsdl20-20040803/, the disclosure of which is incorporated here by reference. Similarly, a description of SOAP can be found online as "SOAP Version 1.2 Part 0: Primer (Second Edition), W3C Recommendation 27 Apr. 2007" at http://www.w3.org/TR/soap12-part0/, the disclosure of which is incorporated by reference. Additionally, for UDDI, a standards document entitled "UDDI Version 3.0.2 UDDI Spec Technical Committee Draft, Dated 20041019" can be found at http://uddi.org/pubs/uddi_v3.htm.

Web Services can be characterized as a technology for exposing application functionality as services to software clients or to server applications. Among other things, Web Services allow for rapid creation of new services by combining existing functionality in new ways. This process is often referred to as composition or orchestration. Typically, Web Services are accessed with XML-encoded SOAP messages using hyper-text transfer protocol (HTTP) as a bearer. However, HTTP is designed for transaction based client/server request patterns where real time properties are not required. Consider in this regard the variable, and sometimes extensive, delays which can occur when a user retrieves a web page by clicking on an HTTP hyperlink. With the increasing demand for service interaction and rapid composition from the users of peer to peer, real-time communication services, there is a need to also apply the Web Services paradigm to this real-time domain.

Accordingly, it would be desirable to address this need by providing techniques for real-time composition of services in communications systems.

SUMMARY

According to an exemplary embodiment, a method includes the steps of transmitting, from an originator node, a Session Initiation Protocol (SIP) message including a Simple Object Access Protocol (SOAP) envelope and a SOAP action header, receiving, at a recipient node, the SIP message, determining whether said SOAP envelope is intended for said recipient node, if so, parsing, at the recipient node, the SOAP envelope from the SIP message, dispatching the SOAP envelope to a corresponding Web Service within the recipient node, and providing a service indicated by the SOAP action header and SOAP envelope.

According to another exemplary embodiment, a method includes the steps of transmitting a Session Initiation Protocol (SIP) message including a Simple Object Access Protocol (SOAP) envelope and SOAP action header which specify a service.

According to still another exemplary embodiment, a computer-readable medium contains instructions which, when executed on a processor, perform the steps of receiving a Session Initiation Protocol (SIP) message including a Simple Object Access Protocol (SOAP) envelope and SOAP action header, parsing the SOAP envelope from the SIP message, dispatching the SOAP envelope to a corresponding Web Service, and receiving a service indicated by the SOAP envelope and SOAP action header.

According to yet another exemplary embodiment, a computer-readable medium contains instructions which, when executed on a processor, perform the step of transmitting a Session Initiation Protocol (SIP) message including a Simple Object Access Protocol (SOAP) envelope and a SOAP action header.

According to still another exemplary embodiment, a communications device includes a processor operating as a Session Initiation Protocol (SIP) user-agent server which receives a SIP message including a Simple Object Access Protocol (SOAP) envelope and a SOAP action header, and a SOAP parser/dispatcher for parsing said SOAP envelope from the SIP message and transmitting the SOAP envelope to a corresponding Web Service.

BRIEF DESCRIPTION OF THE DRAWINGS

The accompanying drawings illustrate exemplary embodiments, wherein.

DETAILED DESCRIPTION

The following detailed description of the exemplary embodiments refers to the accompanying drawings. The same reference numbers in different drawings identify the same or similar elements. Also, the following detailed description does not limit the invention. Instead, the scope of the invention is defined by the appended claims.

According to exemplary embodiments, a solution to the need for real-time composition of services is provided by a Session Initiation Protocol (SIP) transport binding for SOAP messages. SIP signaling is described, for example, in the standards document entitled "Session Initiation Protocol, RFC 3261, authored by Rosenberg et. al., IETF 2002", which is available online at http://tools.ietf.org/html/rfc3261, and the disclosure of which is incorporated here by reference. As stated therein, SIP provides an application-layer control (signaling) protocol for creating, modifying, and terminating sessions with one or more participants. These sessions include, for example, Internet telephone calls, multimedia distribution, and multimedia conferences. SIP invitations are used to create sessions and to carry session descriptions that allow participants to agree on a set of compatible media types. "Proxy servers" are used in SIP environments to help route requests to the user's current location, authenticate and authorize users for services, implement provider call-routing policies, and provide features to users. Of particular interest for the present application, SIP provides real-time services through the use of timers which ensure minimal transaction delays.

SIP service requests can be characterized as, for example, either (1) a request to launch an application, e.g., a request to play a chess game, or (2) a request for some data to be provided or some transaction to be performed as a part of a more complex interaction. The service addressing needed differs depending on which of these two cases are being considered. For the former case (1), referred to herein as the "application launching case", SIP is used to locate and provide parameters to match the request to an application that can be launched, e.g., a multimedia telephony application, a chat application, a chess application, etc. In this case the launched application will then take over application specific signaling using in-session SIP signaling or some other protocol. Thus the need for precise service identification and/or the provision of service parameters is generally non-existent or at least very limited to support SIP service requests involving the launching of applications. Instead, for such SIP requests, the identification of service capabilities is more significant.

The second case (2), which is referred to herein as the "business method integration case", involves accessing services by a composition of complex functions from a number of more or less independent participating functions, e.g., publishing a Line Status Notification as a SIP session is being set up. This business method integration case applies, for example, whenever a user wants or needs to request a specific service (as opposed to requesting any service which provides certain capabilities) in the network or whenever input parameters are necessary to perform the service. Thus, in the business method integration case, as opposed to the application launching case, the ability to precisely identify a requested service and/or provide service parameters is important while the ability to specify a requested capability is less important. Exemplary embodiments of the present invention seek to facilitate the business method integration case. However, SIP service addressing is generally considered to be applicable for application launch only, thereby requiring an application which is launched using SIP to use a second protocol (e.g., HTTP) to perform the business method invocation. This makes existing SIP service addressing based on capabilities ineffective, by itself, for real-time service composition.

Accordingly, these exemplary embodiments provide a SIP transport binding for SOAP messages, i.e., exemplary techniques for transporting SOAP messages between SOAP nodes using SIP as a bearer. A real world example of a business integration case will provide an example of the utility of such a transport binding. Suppose, for example, that a TV channel is associated with a telephone number for charity calls to one of the shows that is being broadcast, e.g., on an IPTV multicast session. As Alice calls the TV channel, e.g., by using a provided link she has found on a web page, the call is routed in real-time to a charity payment service that charges her with a donation before the call is forwarded to the TV studio where she can talk with one of the TV show hosts. This can be accomplished in real-time, according to exemplary embodiments, by leveraging the addressing mechanisms supported by SOAP using SIP as bearer. For example, by adding a SOAPAction header to a SIP message, a SIP user-agent server (UAS) can be identified as the ultimate receiver of the SOAP envelope in the SIP payload. Additionally, a WSDL Interface can be used to describe the semantics of a web service being requested in order for corresponding tools to autogenerate client stubs for using the service. Note in this regard, WSDL 2.0 has migrated to "Interfaces" from "PortTypes" in WSDL 1.0, however, either can be used as examples of mechanisms which point to specific services, i.e., Web Services, and can be used in a SIP/SOAP binding. See, for example, the document WSDL 2.0, Section 2.2 incorporated by reference above. Similarly, "methods" provided in SOAPAction headers according to these exemplary embodiments provide an indicator of the type of service being requested where a Web Service could provide a number of different service variants. In this way information associated with a service's location, identification and/or input parameters is provided in the SIP message in a manner which is specific enough to connect the user to a particular service instance or Interface. Some detailed examples now follow.

Starting first with the SIP/SOAP message itself, various examples of a SIP message carrying one or more SOAP data elements as payload according to exemplary embodiments are presented below. A SOAPAction header is provided within the SIP content to enable the receiving SIP endpoint to determine whether to forward the embedded SOAP envelope for further processing, e.g., if the recipient node supports the Web Service identified in the SOAPAction header. The SOAPAction header provided in the SIP transport binding for SOAP according to these exemplary embodiments uses the URI syntax generically as follows:

SOAPAction: "URI"

A more specific example of a SOAPAction header according to these exemplary embodiments includes a uniform resource name (URN). As will be appreciated by those skilled in the art, a URN is a URI that identifies a resource by name in a particular namespace. In the context of these exemplary embodiments, the URN syntax can be provided to a SOAPAction header as follows:

SOAPAction: "urn:<NID>:<NSS>", where NID is a namespace identifier following, for example, the syntax for NIDs described in URN Syntax, RFC 2141, R. Moats, IETF 1997, and NSS has the following syntax:

NSS: "<Interface>!<methodName>"

The SOAPAction header URI indicates the ultimate receiver of the SOAP message embedded in the SIP message which is carrying it according to these exemplary embodiments. By adding a SOAPAction header to a SIP message, an Interface and method can be addressed by using the namespace specific part of the URN. This enables SIP proxies, and other nodes on the routing path of a particular message, to process the message correctly. The SOAP body references the method provided by the addressed Interface. This method is denoted in the SOAPAction header immediately after the delimiter which, in this exemplary embodiment, is an exclamation mark. Those skilled in the art will, however, appreciate that any unreserved character or character without other meaning can be used as a delimiter between the Interface and method in SOAPAction headers according to other exemplary embodiments.

Consider below another example of a SOAPAction header along with a SOAP body which can be used in SIP/SOAP messages according to these exemplary embodiments.

```
SOAPAction:
"urn:stockservice-ericsson-com:QuoteBean!GetLastTradePrice"
<soap:Body>
    <m:GetLastTradePrice xmlns:m="urn:stockservice-ericsson-com">
    </m:GetLastTradePrice >
</soap:Body>
```

In this example, the Interface QuoteBean is referenced in the SOAPAction header. The method provided by QuoteBean is called GetLastTradePrice. This method is referenced in the SOAPAction header after the exclamation mark. The SOAP body may contain more details relating to the specified method including parameters. For example, consider the more detailed example below. Therein, the Web Service being accessed by the SOAP payload provides stock quotes. More specifically, this particular SOAP message requests the last quote for the current price of Ericsson stock from an Interface called "QuoteBean". This code snippet enables Alice to request a stock quote which she will receive from the UAS that represents Bob, who might be a stock broker. The quote will be returned in, for example, the 200 OK message from Bob as a SOAP envelope. Alternatively, a SIP proxy on the route between Alice's device and Bob's device could provide the quote to Alice, in which case the SIP proxy node would then have been addressed in the SOAPAction header.

```
INVITE sip:bob@ericsson.com SIP/2.0
    Via: SIP/2.0/UDP pc33.atlanta.com;branch=z9hG4bKnashds8
    Max-Forwards: 70
    To: Bob <sip:bob@biloxi.com>
    From: Alice <sip:alice@atlanta.com>;tag=1928301774
    Call-ID: a84b4c76e66710
    CSeq: 314159 INVITE
    Contact: <sip:alice@pc33.atlanta.com>
    Content-Type: text/xml; charset=utf-8
    SOAPAction:
    "urn:stockservice-ericsson-com:QuoteBean!GetLastTradePrice"
    <?xml version="1.0"?>
    <soap:Envelope
        xmlns:soap="http://schemas.xmlsoap.org/soap/envelope/"
    soa:encodingStyle="http://schemas.xmlsoap.org/soap/encoding/">
        <soap:Body>
            <m:GetLastTradePrice xmlns:m=
            "urn:stockservice-ericsson-com">
                <symbol>ERIC B</symbol>
            </m:GetLastTradePrice>
        </soap:Body>
    </soap:Envelope>
```

Note therein again that a SOAPAction header is added to the list of standard SIP headers and bolded in the foregoing example. The SOAPAction header contains a uniform resource identifier (URI) that identifies a Web service that optionally can be described as a WSDL Interface (QuoteBean) and method name (GetLastTradePrice), thereby providing a mechanism according to these exemplary embodiments for precisely identifying a requested service. Additionally, in this example, the parameter "ERIC B" is provided in the SOAP Envelope to more completely specify the service being requested, i.e., to provide the current stock price of Ericsson stock having the symbol ERIC B. It will be appreciated, however, that some service requests may require more parameters (or no parameters) to fully specify the desired service and, as such, a SIP/SOAP message according to these exemplary embodiments may contain as many parameters as needed.

Figure 1A:
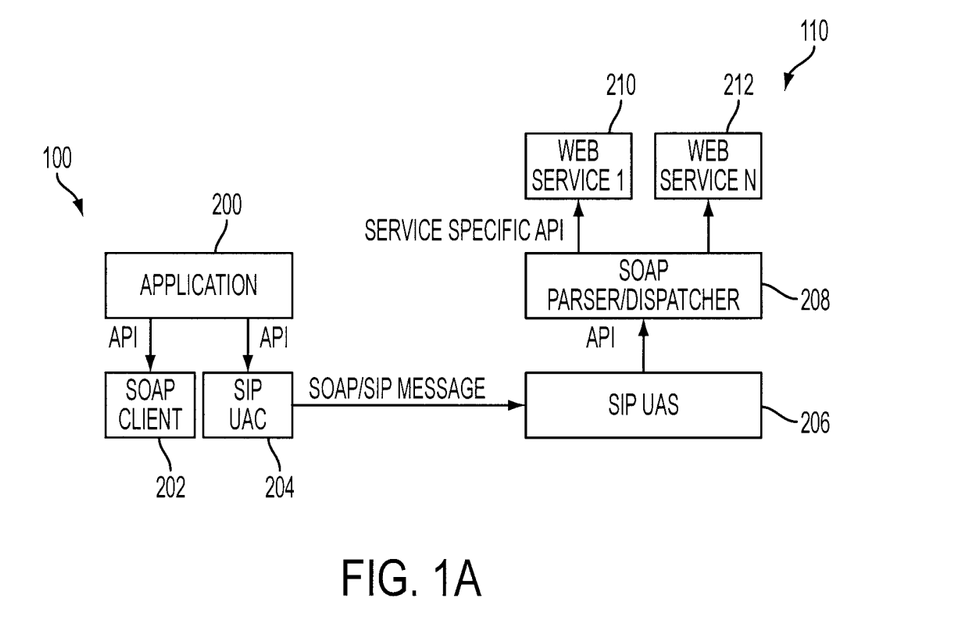
FIG. 1(a) depicts transmission of SIP message including a SOAP payload according to an exemplary embodiment.

Having illustrated some code snippets of an exemplary SIP/SOAP combination, and an exemplary SOAP syntax for implementing a SIP transport binding of an embedded SOAP message, some higher level implementations which employ such messages to invoke real-time composition of services according to these exemplary embodiments will now be discussed. FIG. 1(a) illustrates one way in which an application or device according to these exemplary embodiments uses a SOAP client to construct a SOAP envelope in order to invoke a web service method while initiating a SIP session between an originating node 100 and a recipient node 110. Therein, the client application 200 uses an application programming interface (API) to create a SOAP message using a SOAP client 202, e.g., a SOAP Envelope having a SOAP body with, optionally, additional parameters indicative of the service to be requested. The SOAP message, examples of which are provided above, is then passed as all or part of the payload in a SIP message generated by SIP user-agent client (UAC) 204, for example, a SIP INVITE message, along with a SOAPAction header. The SIP UAC 204 can use client stubs generated by WSDL Interface syntax to create the SOAPAction header and envelope. It will be appreciated, however, that SIP messages other than SIP INVITE may also be used to carry the SOAP payload according to these exemplary embodiments, e.g., SIP OPTIONS or MESSAGE, if session initiation is not required for the particular service request.

The SIP UAC 204 sends the message over, for example, a user datagram protocol (UDP)/IP or transmission control protocol (TCP)/IP link (wireline or wireless) to the ultimate destination which is indicated by the SOAPAction header provided as part of the SIP payload. There may, of course, be intervening nodes (not illustrated in FIG. 2(a)), e.g., SIP proxies. The ultimate destination (recipient node 110) contains a SIP user-agent server (UAS) 206 as well as a SOAP endpoint 208 which is able to parse and dispatch the SOAP message to the corresponding Web Service indicated in the SOAPAction header carried as the SIP payload, e.g., one of the Web Services 210 or 212, via a service specific API. The SOAPAction header is processed by the SIP UAS 206 to determine whether the SOAP envelope payload should be passed on to the SOAP parser/dispatcher 208. Note in this regard that the ultimate receiver of the SIP message may differ from, or be the same as, the ultimate receiver of the SOAP envelope carried therein. In, for example, the above-described case where Alice calls a charity telethon TV show, the routing of the SOAP envelope toward a charity payment service that charges her with a donation can be performed by a SIP proxy node which is disposed between Alice's user device and the application server associated with handling the call to the TV show host. Thus, in this latter case, when the intervening SIP proxy node receives the SIP/SOAP message, its analysis of the SOAPAction header will inform it that the SOAP envelope should be processed locally and its parser/dispatcher 208 will extract the SOAP envelope and pass it on to a Web Service 210, 212 that handles payment. Then the SIP message will be forwarded onto its ultimate destination, e.g., a VoIP application server (not shown in FIG. 1(a).

Figure 1B:
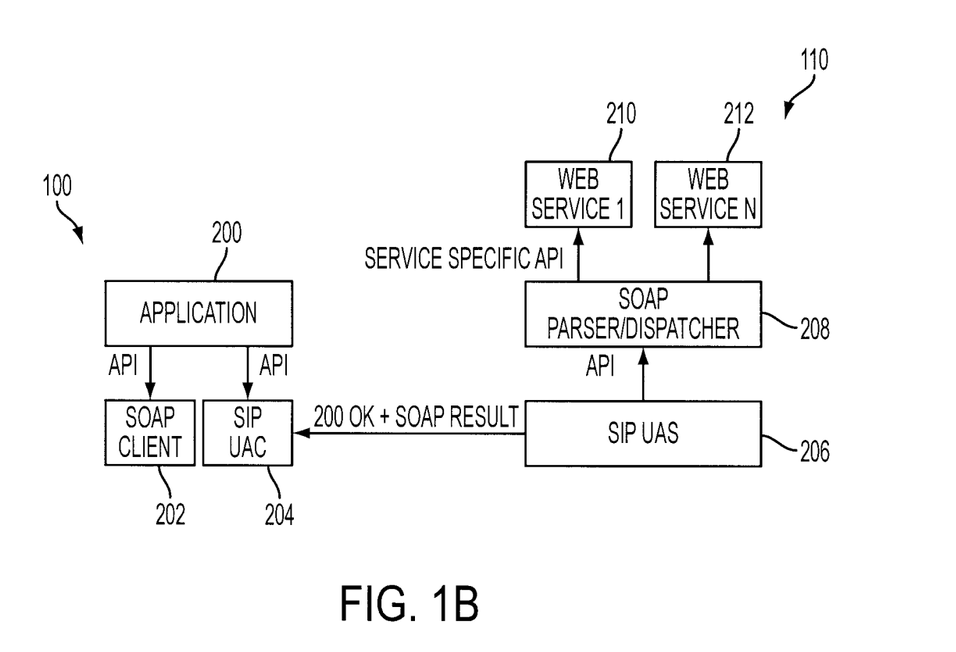
FIG. 1(b) shows acknowledgement of the SIP message including the SOAP payload according to an exemplary embodiment.

The UAS 206 can, for example, be preconfigured to include a list of currently deployed Web Services 210, 212 within the recipient node 110 to assist with the processing of the SOAPAction header. Typically, the response to the SOAP message will then be provided in the payload of a SIP 200 OK message, as shown in FIG. 1(*b*), which is returned to the client from the SIP UAS 230.

A Web Service provided by Web Services 210 and 212 can be defined, for example, as a software system designed to support interoperable machine to machine interactions over a network. In some implementations, Web Services can be provided as Web APIs accessible via a network (such as the Internet) and executed on a remote system hosting the requested services. However, in the exemplary embodiments illustrated above with respect to FIGS. 1(*a*) and 1(*b*), the Web Services 210 and 212 are part of a recipient node which includes the SOAP parser/dispatcher 208 and SIP UAS 206. Similarly, elements 200, 202 and 204 are part of an originator node associated with the SOAP/SIP message being transmitted. Thus, assuming that a match is found by SIP UAS 230 in processing the SOAPAction header, a corresponding one of the Web Services 210, 212 will provide the service requested via the SOAP Envelope to the recipient node 110. It will also be appreciated that a given recipient node 110 may have more or fewer than two Web Services integrated therewith.

The SOAPAction header, which provides the Interface and the method indications, and SOAP Envelope can be provided by themselves within a SIP message, as illustrated above, or with other content. For example, by using Multipurpose Internet Mail Extensions (MIME) multipart, a SIP message can contain a Session Description Protocol (SDP), or other content, as payload in addition to the embedded SOAP information. An example of this type of multipart SIP message according to an exemplary embodiment is provided below.

---

INVITE sip:bob@biloxi.com SIP/2.0
    Via: SIP/2.0/UDP pc33.atlanta.com;branch=z9hG4bKnashds8
    To: Bob <sip:bob@biloxi.com>
    From: Alice <sip:alice@atlanta.com>;tag=1928301774
    Call-ID: a84b4c76e66710
    CSeq: 314159 INVITE
    Max-Forwards: 70
    Date: Thu, 21 Feb 2002 13:02:03 GMT
    Contact: <sip:alice@pc33.atlanta.com>
    Content-Type: multipart/mixed;boundary=boundary42
    Content-Length: 568
    --boundary42
    Content-Type: message/sip
    INVITE sip:bob@biloxi.com SIP/2.0
    . . .
    Content-Type: application/sdp
    Content-Length: 147
    v=0
    o=UserA 2890844526 2890844526 IN IP4 here.com
    s=Session SDP
    c=IN IP4 pc33.atlanta.com
    t=0 0
    m=audio 49172 RTP/AVP 0
    a=rtpmap:0 PCMU/8000
    --boundary42
    Content-Type: text/xml
        SOAPAction:
        "urn:stockquote-biloxi-com:QuoteBean!GetLastTradePrice"
        <?xml version="1.0"?>
        <soap:Envelope
        . . .

---

Therein, it will be seen that the Content-Type headers defined in MIME multipart provide a structure by which a SIP message may contain payloads in addition to the SOAPAction header, and optionally SOAP Envelope body, according to these exemplary embodiments.

Figure 2:
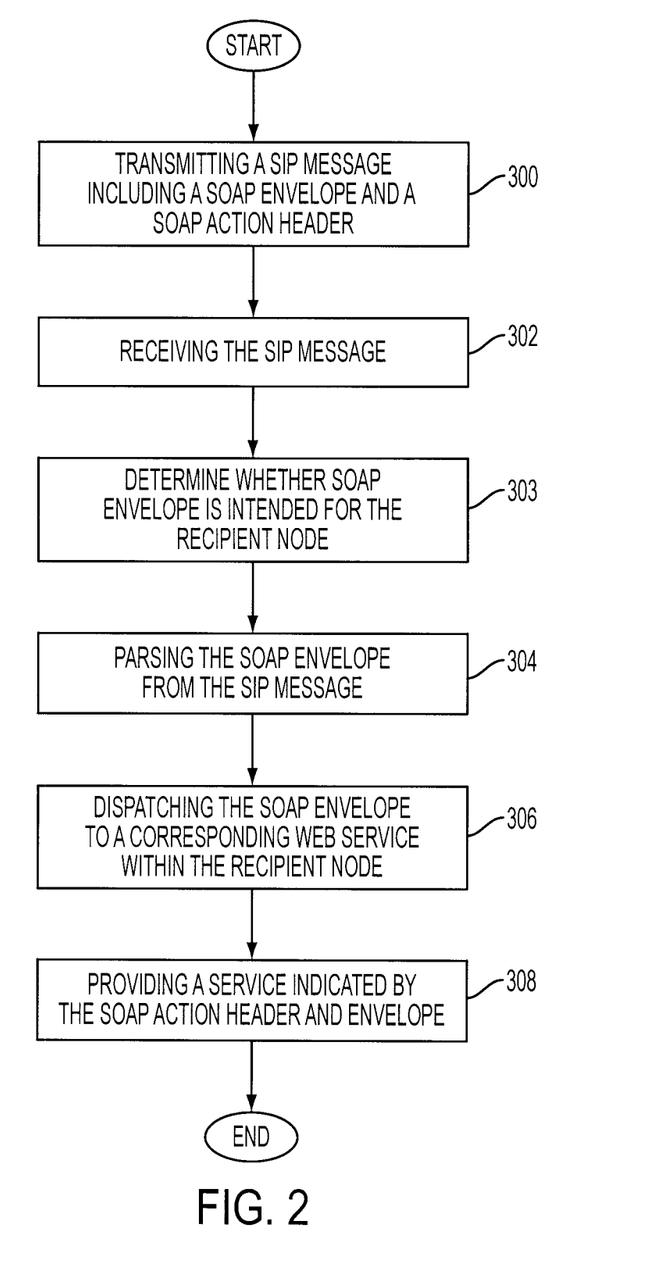
FIG. 2 is a flowchart illustrating a method according to an exemplary embodiment.
Figure 3:
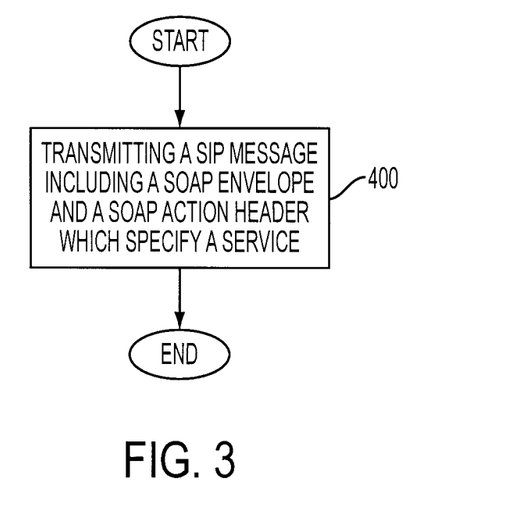
FIG. 3 is another flowchart illustrating another method according to another exemplary embodiment.

Based upon the foregoing description, it will be appreciated that various methods, e.g., for communicating, are presented by these exemplary embodiments. One such method is illustrated in the flowchart of FIG. 2. Therein, a SIP message including a SOAP envelope and a SOAP action header is transmitted at step 300. The SIP message is received at step 302 and the SOAPAction header is evaluated at step 303 to determine whether the SOAP Envelope is intended for that particular, recipient node. If so, the SIP/SOAP message is parsed to remove the SOAP envelope from the SIP message (step 304). The SOAP envelope may then be passed on to a corresponding Web Service at step 306. Then the service indicated by the SOAP Envelope and SOAPAction header can be provided to the recipient of the SIP message at step 308. Of course, given the fundamental nature of these exemplary embodiments, the exemplary method illustrated in FIG. 2 can be further generalized as, for example, illustrated in FIG. 3. Therein, at step 400, a Session Initiation Protocol (SIP) message including a Simple Object Access Protocol (SOAP) envelope and a SOAP action header which identify a service are transmitted, i.e., a Session Initiation Protocol (SIP) transport binding for SOAP messages.

Thus it will be apparent that, by combining Web Services (SOAP, WSDL and UDDI) and SIP, these exemplary embodiments enable, for example, an application developer to have access to a wide range of Internet services that can be interwoven during the session set up phase of SIP. Furthermore, SIP service composition can shorten the time to market for new, innovative end user services as well as open up business to business interaction over SIP by providing a facility for the real-time composition of services. Some examples of applications of these techniques were provided above. Many others are contemplated herein. For example, in the context of integrating presence notification and multimedia session setup, consider the following. As Alice makes the call to Bob she also chooses to indicate that her presence should be set to busy for all her watchers. As the session is being set up, the application server in Alice's home domain notifies the presence agent that her activity status is Busy, i.e., by virtue of a SOAP Action header and/or other SOAP data elements passed along with the SIP session setup message to the application server. Then, all watchers on Alice's presence list will now see Alice's presence status change for the duration of the call.

The afore-described, and other, exemplary systems and methods for communicating can be implemented by one or more processors executing sequences of instructions contained in a memory device. Such instructions may be read into the memory device from other computer-readable mediums such as secondary data storage device(s). Execution of the sequences of instructions contained in the memory device causes the processor to operate, for example, as described above to send or receive SIP/SOAP messages. In alternative embodiments, hard-wire circuitry may be used in place of or in combination with software instructions to implement these exemplary embodiments.

Figure 4:
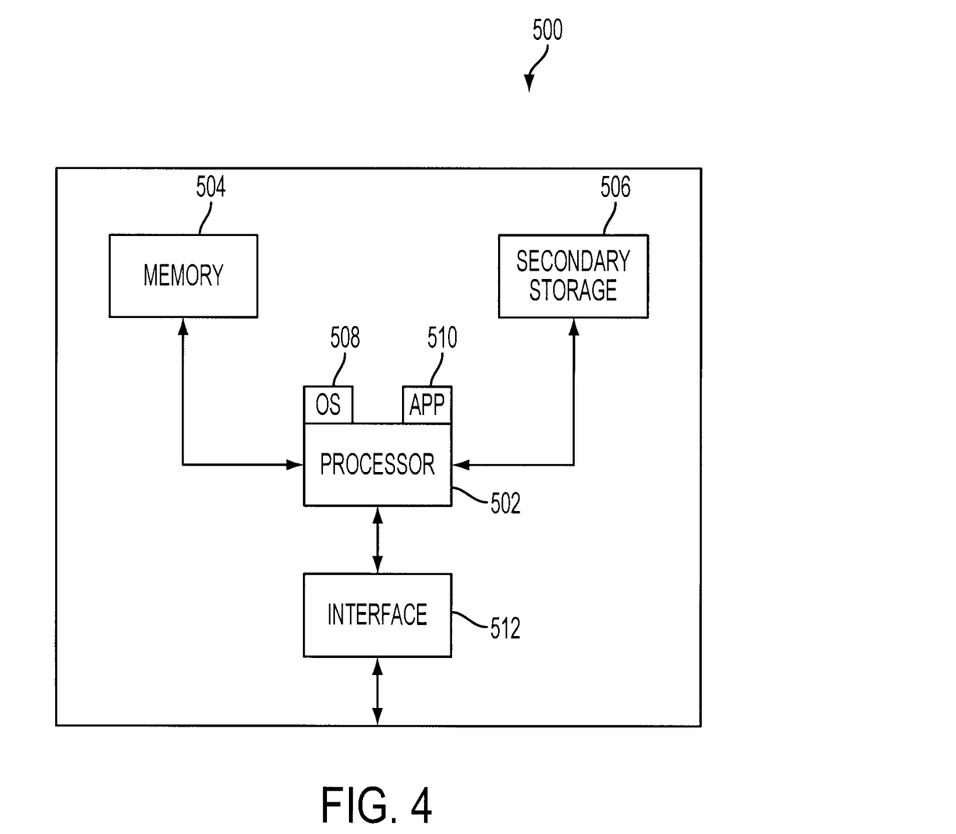
FIG. 4 depicts a communication device according to an exemplary embodiment.

It will be further appreciated that such embodiments can take various physical forms and may be used in, for example, various consumer electronic goods including (but not limited to) smart phones, personal digital assistants (PDAs), laptop computers, and the like. Generally speaking, a communication device which transmits or receives SIP/SOAP messages as described above may include the elements of the generic communication device illustrated in FIG. 4. Therein, a communication device 500 can include a processor 502 (or multiple processor cores), memory 504, optionally, one or more secondary storage devices 506, an operating system 508 running on the processor 502 and using the memory 504, as well as a one or more corresponding application(s) 510. An interface unit 512 may be provided to facilitate communications between the device 500 and the rest of a network or other peer-to-peer devices, or may be integrated into the processor 502. A wireless transceiver (not shown) could be included as part of the interface unit 512 if the device 500 is communicating over an air interface.

The above-described exemplary embodiments are intended to be illustrative in all respects, rather than restrictive, of the present invention. Thus the present invention is capable of many variations in detailed implementation that can be derived from the description contained herein by a person skilled in the art. All such variations and modifications are considered to be within the scope and spirit of the present invention as defined by the following claims. No element, act, or instruction used in the description of the present application should be construed as critical or essential to the invention unless explicitly described as such. Also, as used herein, the article "a" is intended to include one or more items.

What is claimed is:

1. A method comprising:
   transmitting, from an originator node, a Session Initiation Protocol (SIP) message including a Simple Object Access Protocol (SOAP) envelope and a SOAP action header;
   receiving, at a recipient node, said SIP message;
   determining whether said SOAP envelope is intended for said recipient node or another node;
   if said SOAP envelope is intended for said recipient node, parsing, at said recipient node, said SOAP envelope from said SIP message;
   dispatching said SOAP envelope to a corresponding Web Service within said recipient node; and
   providing, at said recipient node, a service indicated by said SOAP action header and SOAP envelope, wherein said SOAP action header includes a Web Services Description Language (WSDL) Interface and a method associated with said service.

2. The method of claim 1, wherein said WSDL Interface identifies a location of said service and said method identifies a type of said service.

3. A non-transitory computer-readable medium containing instructions which, when executed on a processor, perform the steps of:
   receiving, at a recipient node, a Session Initiation Protocol (SIP) message including a Simple Object Access Protocol (SOAP) envelope and a SOAP action header;
   determining whether said SOAP envelope is intended for said recipient node or another node;
   if said SOAP envelope is intended for said recipient node, parsing said SOAP envelope from said SIP message;
   dispatching said SOAP envelope to a corresponding Web Service; and
   providing a service indicated by said SOAP action header and SOAP envelope, wherein said SOAP action header includes a Web Services Description Language (WSDL) Interface and a method associated with said service.

4. The non-transitory computer-readable medium of claim 3, wherein said WSDL Interface identifies a location of said service and said method identifies a type of said service.

5. A communications device comprising:
   a processor operating as a Session Initiation Protocol (SIP) user-agent server which receives a SIP message including a Simple Object Access Protocol (SOAP) envelope and a SOAP action header, wherein said processor also determines whether said SOAP envelope is intended for a recipient node upon which said processor is located or another node; and
   a SOAP parser/dispatcher for parsing said SOAP envelope from said SIP message and transmitting said SOAP envelope to a corresponding Web Service if said SOAP envelope is intended for said recipient node upon which said processor is located, wherein said SOAP action header includes a Web Services Description Language (WSDL) Interface and a method associated with said service.

6. The communications device of claim 5, wherein said WSDL Interface identifies a location of said service and said method identifies a type of said service.

* * * * *